United States Patent [19]

Obermann

[11] 4,179,945

[45] Dec. 25, 1979

[54] VARIABLE STEP SIZE IMPULSE DRIVE

[75] Inventor: George Obermann, Niles, Ill.

[73] Assignee: The Singer Company, New York, N.Y.

[21] Appl. No.: 939,321

[22] Filed: Sep. 5, 1978

[51] Int. Cl.² ............................................. F16H 29/00
[52] U.S. Cl. .................................................. 74/122
[58] Field of Search ......................... 74/122, 124, 125

[56] References Cited

U.S. PATENT DOCUMENTS

| | | | |
|---|---|---|---|
| 3,354,733 | 11/1967 | Cartier | 74/125 |
| 3,395,585 | 8/1968 | Obermann | 74/124 |
| 3,724,248 | 4/1973 | Obermann | 74/122 |

Primary Examiner—Robert Mackev

[57] ABSTRACT

The impulse drive mechanism has a drive pawl which is periodically retracted sufficiently to engage a tooth at maximum tooth spacing to advance the sequence control cam a maximum step. If a lesser step is desired (can be used) the ratchet tooth spacing is decreased and the masking device which incorporates a follower engaging the cam on the inside of the ratchet is moved into position to prevent engagement of the pawl with a tooth at greater spacing. The cam drum can be advanced in small angular increments when only tolling time and the angular increment can be increased to accomodate sequential switching during the advance step if required.

10 Claims, 4 Drawing Figures

VARIABLE STEP SIZE IMPULSE DRIVE

BACKGROUND OF THE INVENTION

Process timers such as used on clothes washing machines generally have a sequence control cam (drum or disc) which is rotated one revolution (360°) and has various cams for sequencing the program function switches. During some steps of the drum various switches are actually sequenced relative to each other and this has generally kept the angular step to 6-7½° which means a total of 60 or 50 steps per revolution. As the program content increases there is need for more steps ... a need which runs counter to the need for steps large enough to provide sequencing during the step. Some steps do nothing more than take time and can in theory be appreciably smaller but there has been no way to accommodate appreciable variation in step size. Some variation while maintaining accuracy was shown in my U.S. Pat. No. 3,395,585 which could vary between 6° and 8°. An arrangement for stretching an interval by requiring the pawl to drive a mask out of the way to reach the ratchet is shown in U.S. Pat. No. 3,306,118 but accuracy of the steps was not as good as in my patent.

SUMMARY OF THE INVENTION

The principal object of this invention is to provide sequence timer having an impulse step drive mechanism providing angular steps of various size matched to the sequence needs and sensing the size of the step the cam is to make. With this invention steps of 2½°-7½° are readily provided. The drive pawl is periodically impulsed to engage a ratchet tooth 7½° from the prior tooth. If a lesser step is to be taken a mask is moved into position to prevent the pawl from engaging any but the next tooth which can be only 2½° from the prior tooth. Movement of the mask is controlled by a cam on the inside of the ratchet and having 3 diameters for positioning the mask. In one position the mask limits pawl engagement with a tooth to 2½°, the middle position allows engagement with a tooth between 4° and 5° from the prior tooth, and the third position allows for tooth spacing of 5½° to 7½°. This invention is compatible with the drive in my U.S. Pat. No. 3,395,585 and therefore has the step accuracy of that construction which has proven to be outstanding. And that construction with its control of the ratchet position at the end of the step enhances the ability of the present invention to control small steps accurately.

DETAILED DESCRIPTION OF THE PREFERRED EMBODIMENT

Figure 1:
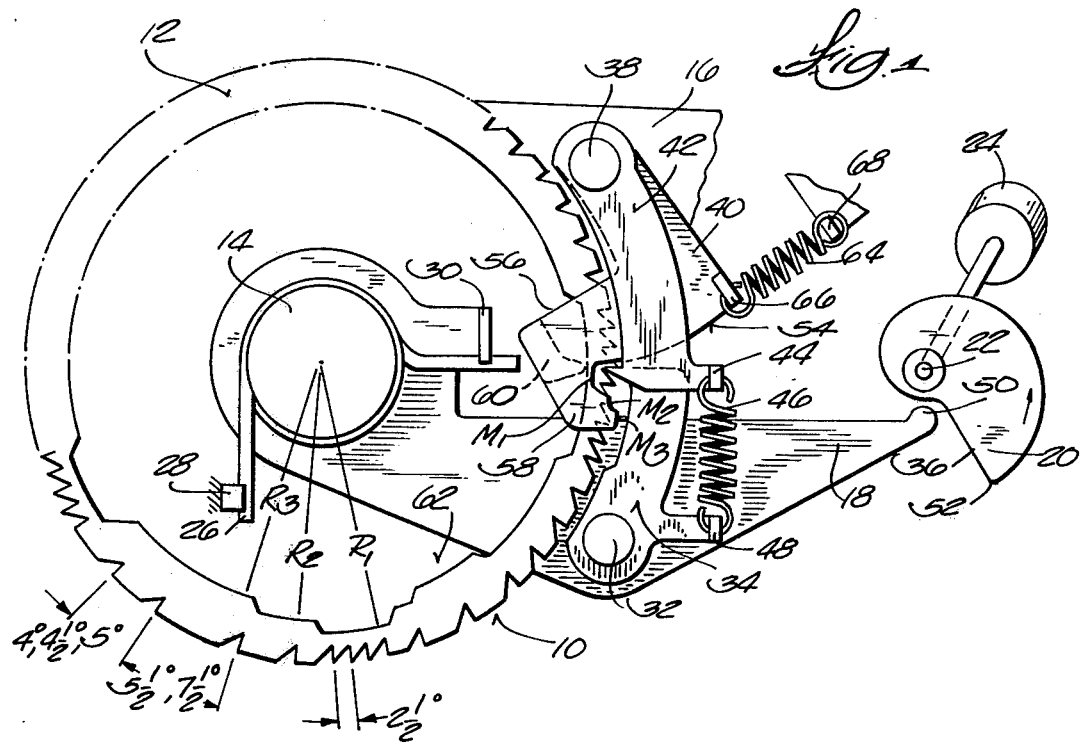
FIG. 1 is a partly schematic plan view showing the arrangement of the parts with the step-limiting mask in position to limit the step to 2½°.
Figure 2:
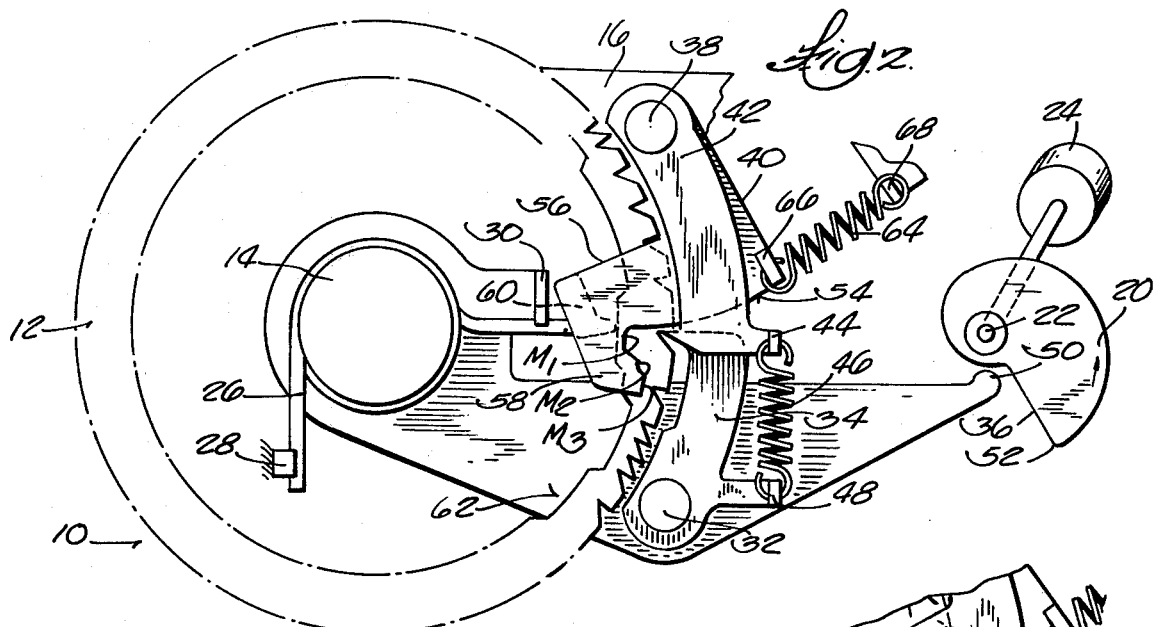
FIG. 2 is similar to FIG. 1 but the mask is retracted and a full step can be taken.
Figure 4:
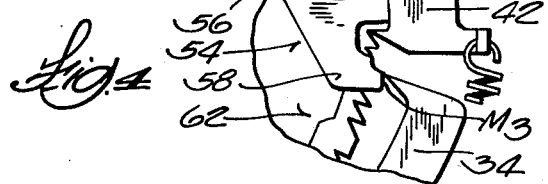
FIG. 4 shows the parts of FIG. 1 with the impulse pawl retracted ready to deliver the step impulse.
Figure 3:
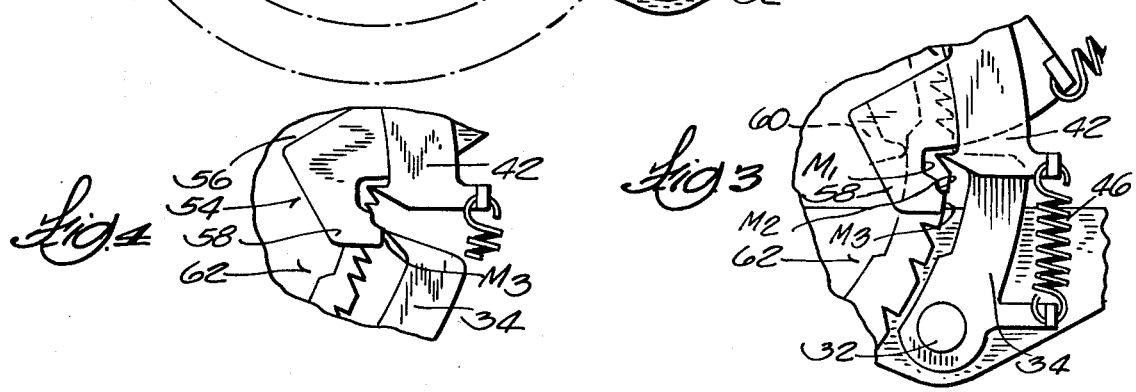
FIG. 3 is a detail showing another mask position limiting the step to the intermediate range.

Ratchet wheel 10 is carried at one end of timer cam bank 12 which is provided with a plurality of cams each of which is adapted to actuate one or more switches in a sequence determined by the rotational position of the cam bank. The cam bank is mounted for rotation about the axis of the cam bank with hub 14 projecting into a cooperating aperture in the timer end plate 16. Lever 18 is journaled on the hub for movement about the same axis and projects to one side for actuation by cam 20 which is rotatable with shaft 22 driven by motor 24. Spring 26 is coiled around hub 14 and has one end anchored against a fixed abutment 28 while the other end bears against the upstanding tab 30 on the lever to urge the lever against the contour or face of drive cam 20. Drive lever 18 carries a pin 32 on which drive pawl 34 is mounted. As the drive cam rotates in a counterclockwise direction, the lever is moved in a clockwise direction about its pivot point to a maximum position and then the follower 50 drops down the slightly inclined or non-radial face 36 to deliver an impulse of power to the timer cam bank 12 by reason of engagement of the drive pawl with the ratchet.

Fixed pin 38 on the end plate 16 supports spacer 40 and pivotally mounted stop pawl 42. Stop pawl 42 has an upstanding tab 44 which serves as an anchor point for tension spring 46, the other end of which is anchored on the upstanding tab 48 carried by the drive pawl 34. This biases both pawls into engagement with the ratchet teeth.

As cam 20 rotates in a counterclockwise direction the follower 50 is moved downwardly to pull the drive pawl rearwardly to "take a bite" on the next tooth. During this retracting motion of the drive pawl, the stop pawl prevents movement of the ratchet and cam bank by reason of its engagement with the ratchet wheel 10. When the follower drops off lobe 52 of drive cam 20, it rapidly comes down the inclined face 36 until the drive pawl, which has now picked up and is driving a ratchet tooth, comes into contact with the end of spacer 40 which now determines the exact end position of the step. This is slightly beyond the position which would be determined by the operating face of the stop pawl 42 to insure that the stop pawl drops into place. Since both the spacer and the stop pawl are located by the same pivot the difference in length between the spacer and the stop pawl will determine this stop pawl gap and this gap is kept within small tolerances resulting in a more accurate drive. Since both pawls operate on the same tooth, no allowance for tooth-to-tooth error is required and the stop pawl gap can be reduced with increased capacity for accurate sequencing of switches actuated by the cam bank.

The construction described to this point is essentially that of my U.S. Pat. No. 3,395,585 and has unique features which enhance the present invention.

The spacer 40 is pivoted on pivot 38 (in my U.S. Pat. No. 3,395,585 patent the spacer did not need to pivot) and the stop (limiting) face 54 is curved with pivot 38 as its center to provide an operative stop in any position of the spacer. The spacer also has a laterally projecting portion 56 fixed thereon and formed to project beyond the end of the ratchet to project inside the cam bank and ratchet. The inner part of portion 56 has a mask 58 and a cam follower 60 which rides on the surface of control cam 62 molded on the inside of ratchet 10. Spring 64 tensioned between tab 66 on spacer 40 and fixed tab 68 biases the spacer counter clockwise to hold the follower on the control cam. Cam 62 has a contour having three active surfaces and three different radii $R_1$, $R_2$ and $R_3$. When follower 60 is on radius $R_1$ mask 58 is in its maximum masking position and the drive pawl can only reach and engage a tooth 2½° from the tooth last engaged. This 2½° spacing is the minimum I utilize. It will be noted that I have provided for three spacings of the teeth, the first being 2½°, the second being for 4°, 4½°, 5° and the third embracing steps of 5½° to 7½°. The 2½° step is used where nothing much happens at that step and the only purpose is to use up time. The mask allows the tip of the drive pawl to drop only into notch $M_1$ and it can only engage the next tooth at 2½° when the follower 60 is on radius $R_1$. If the follower is on radius $R_2$ the drive pawl can now engage a tooth at 4°, 4½° or 5° from the tooth last engaged since a tooth so positioned will be accessible by reason of cut-out $M_2$. The pawl is actually retracted somewhat more than 7½° in preparation for a step but mask surface $M_3$ will prevent engagement of the pawl with a tooth anywhere from 5½° to 7½° from the last engaged tooth with the follower on $R_2$. With the follower on $R_3$ the mask is fully retracted and the pawl can engage a tooth as much as 7½° from the last engaged tooth.

When the pawl drives a tooth 5½° to 7½° there is ample travel for proper sequencing of switches during the step. A simple switching operation may only require 4° to 5° steps and, as noted, simply tolling time can be confined to 2½° step. Therefore, while the indexing mechanism can (and does) deliver a uniform actuating stroke for a 7½° step the mask functions to limit the step, when desired, to lesser stops. In the prior art the step size was basically uniform and sized to that necessary for proper sequencing of the switches. With the present design simpler switching can be done in fewer degrees and non-switching can be done in still fewer degrees. The cumulative total of degrees so saved can now be used to provide added functions or cycles. This then adds to the versatility or utility of the timer.

As shown, the timing cams are on the outside of the drum type cam bank but this invention is of equal utility in connecting with a disc type (face cam) timing cam. The drawings illustrate various tooth spacings and the relationship of the control cam contour to the teeth. In some instances it is not necessary to actuate the mask even though a small step is to be taken. For example, after a given step is taken one could provide for the next step at 2½° (or 4°, 4½° or 5°) followed by a step of 7½° and not require masking simply because only one tooth (the one at 2½°, 4°, 4½° or 5°) can lie in the stroke (7½°) of the drive pawl. Put another way the next tooth space—2½°—plus the next at 7½° will be 10° placing the 2nd tooth to be actuated out of reach of the drive pawl ... therefore no masking is required.

I claim:

1. The combination with a timer of the type having a switching device rotated in a step-by-step manner, of
    a ratchet mounted for rotation about its axis and including ratchet teeth,
    a pivot,
    a lever mounted on the pivot and including a cam follower,
    a rotatable impulse cam having a slow-rise, fast-drop face,
    spring means biasing the follower against the cam face,
    a drive pawl pivoted on the lever,
    said pawl being biased into engagement with the ratchet,
    said cam actuating the pawl a fixed distance equivalent to a fixed angular relationship to said ratchet each time said follower drops down the fast-drop face,
    said ratchet teeth having various angular spacings up to said fixed angular relationship,
    means sensing the angular size of the step next to be taken and limiting engagement of the pawl with the ratchet accordingly.

2. Apparatus according to claim 1 in which the sensing means includes,
    a mask operative to prevent engagement of the pawl with a tooth within said fixed angular relationship but more than the spacing of the next to be engaged tooth from the last engaged tooth,
    and a control cam fixed with respect to and rotatable with said ratchet and controlling movement of said mask into operative position.

3. The combination with a timer of the type having a switching device rotated in a step-by-step manner, of
    a ratchet mounted for rotation about its axis and including ratchet teeth,
    a pivot,
    a lever mounted on the pivot and including a cam follower,
    a rotatable impulse cam having a slow-rise, fast-drop face,
    spring means biasing the follower against the cam face,
    a drive pawl pivoted on the lever,
    said pawl being biased into engagement with the ratchet,
    the teeth on said ratchet having various angular spacings up to X°
    and means preventing engagement of the pawl with any but the next tooth even though more than one tooth may be within X° of the tooth last engaged.

4. The combination with a timer of the type having a switching device rotated in a step-by-step manner, of
    a ratchet mounted for rotation about its axis and including ratchet teeth,
    a pivot,
    a lever mounted on the pivot and including a cam follower,
    a rotatable impulse cam having a slow-rise, fast-drop face,
    spring means biasing the follower against the cam face, a drive pawl pivoted on the lever,
    said pawl being biased into engagement with the ratchet,
    the geomertry of the lever and cam rise being selected so the drive pawl is retracted a finite distance as the cam rotates so as to be capable of engagement with a ratchet tooth having an angular position relative to the previously engaged tooth of X°,
    the teeth on said ratchet being spaced by various spacings up to X°,
    a control cam fixed with respect to and rotatable with said ratchet,
    a control follower engageable with said control cam,
    a masking device controlled by the control follower and moveable into position limiting engagement of the pawl to the next tooth even though more than one tooth may be within X° of the last tooth engaged so the ratchet is advanced only the number of degrees by which said last tooth and said next tooth are separated.

5. According to claim 4 in which the masking device has a plurality of positions each limiting the advance to less than X° and each of which differs from the other.

6. According to claim 4 in which said masking device is required to be moved into operative position only when the angular degrees of said next step plus the number of degrees to be taken in the subsequent step is less than X°.

7. Apparatus according to claim 4 in which said masking device and said control follower are carried on a pivoted arm having a spacer portion engaged by said pawl at the end of each advance to provide a positive limit to the advance.

8. Apparatus according to claim 7 including a stop pawl mounted on the same pivot as said arm and engageable with said ratchet to prevent reverse rotation of the ratchet.

9. Apparatus according to claim 8 in which said ratchet is on the outside of a rotatable member and the control cam is on the inside of the member.

10. Apparatus according to claim 9 in which the control cam has three active control surfaces one serving to position the mask to limit drive pawl engagement with the ratchet to teeth lying within a small range of angular separation from the last engaged tooth, another serving to limit drive pawl engagement with the ratchet to teeth lying within an intermediate range of separation from the last engaged tooth, and the third serving to limit drive pawl engagement with the ratchet to teeth separated from the last engaged tooth by a maximum range approximating and including X°.

* * * * *